United States Patent [19]

Ahmad et al.

[11] Patent Number: 5,614,893
[45] Date of Patent: Mar. 25, 1997

[54] GROUND CONDITION MONITOR

[75] Inventors: Falih Ahmad, Clinton, Miss.; James A. Evans, Tallulah, La.; George L. Mason, Vicksburg, Miss.

[73] Assignee: The United States of America Army Corps of Engineers as represented by the Secretary of the Army, Washington, D.C.

[21] Appl. No.: 598,313

[22] Filed: Feb. 8, 1996

[51] Int. Cl.$^6$ ................................................ G08B 21/00
[52] U.S. Cl. ................ 340/870.16; 340/539; 340/690; 342/22; 324/337
[58] Field of Search ................ 340/870.16, 870.18, 340/539, 690; 342/22; 324/337, 334

[56] References Cited

U.S. PATENT DOCUMENTS

| | | | |
|---|---|---|---|
| 2,365,220 | 9/1953 | Bays | 324/334 |
| 2,992,325 | 7/1961 | Lehan | 324/334 |
| 3,949,353 | 4/1976 | Waters et al. | 340/690 |
| 3,987,406 | 10/1976 | Broding | 340/15.5 TS |
| 3,996,553 | 12/1976 | Siems et al. | 340/15.5 TS |
| 4,023,140 | 5/1977 | Siems et al. | 340/15.5 TS |
| 4,583,207 | 4/1986 | Greer, Jr. | 367/178 |
| 4,904,942 | 2/1990 | Thompson | 324/334 |
| 5,379,025 | 1/1995 | Tatom et al. | 340/690 |
| 5,387,869 | 2/1995 | Enomoto | 324/348 |
| 5,557,258 | 9/1996 | Eslambolchi | 340/539 |
| 5,563,847 | 10/1996 | Grouffal et al. | 340/870.18 |

*Primary Examiner*—Jeffery Hofsass
*Assistant Examiner*—Timothy Edwards, Jr.
*Attorney, Agent, or Firm*—Luther A. Marsh

[57] ABSTRACT

A ground condition monitor includes a housing for disposal underground, a power source disposed in the housing, and a controller disposed in the housing and in communication with the power source and with a plurality of sensors. The sensors are adapted to receive signals from the controller and in response thereto to send electromagnetic excitation signals into surrounding earth, receive reflective electromagnetic signals from the surrounding earth, and feed the reflective signals to the controller, which is adapted to convert the reflective signals to data indicative of electromagnetic properties of the surrounding earth, and to transmit the data. The monitor further includes a telemeter in communication with the power source and disposed in the housing for receiving the data from the controller and transmitting the data to a remote station, and an antenna extending from the housing for disposition in part above the surface of the earth, and adapted to transmit the data from the telemeter to the remote station, to receive signals from the remote station, and to transmit the signals received from the remote station to the controller.

7 Claims, 2 Drawing Sheets

GROUND CONDITION MONITOR

BACKGROUND OF THE INVENTION (1) Field of the Invention

This invention relates to monitoring devices and is directed more particularly to a monitoring device for monitoring the condition of earthworks, such as levees, earthen dams, and the like.

(2) Description of the Prior Art

Fatigue and pressure build-up in levees, and similar earthen structures, cause failures of such structures, usually with little or no warning. Early detection of weakened regions of a levee provides engineers with an opportunity to shore up the weakened sections and avert disaster. However, unless a weakened levee exhibits some degree of collapse or erosion, obvious to the eye, on-site inspections are not likely to provide forewarning. Visual inspection has been found inadequate to diagnose, and provide the opportunity to prevent, catastrophic failure.

Accordingly, there is a need for a monitor for continuously or intermittently obtaining data from the earth in critical areas and providing information as to the structural condition of the earth.

SUMMARY OF THE INVENTION

An object of the invention is, therefore, to provide a ground condition monitor for determining the structural integrity of an earthen work, such as a levee or dam.

With the above and other objects in view, as will hereinafter appear, a feature of the present invention is the provision of a ground condition monitor comprising a housing for disposal underground, a power source disposed in the housing, and a controller disposed in the housing and in communication with the power source and with a plurality of sensors. The sensors are adapted to receive signals from the controller and, in response thereto, to send electromagnetic excitation signals into the surrounding earth, receive reflective electromagnetic signals from the surrounding earth, and feed the reflective signals to the controller. The controller is adapted to convert the reflective signals to data indicative of electromagnetic properties of the surrounding earth, and to transmit the data. The monitor further comprises a telemeter in communication with the power source and disposed in the housing for receiving the data from the controller and transmitting the data to a remote station. An antenna extends from the housing for disposition in part above the surface of the earth, and is adapted to transmit the data from the telemeter to the remote station, to receive signals from the remote station, and to transmit the signals received from the remote station to the controller.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
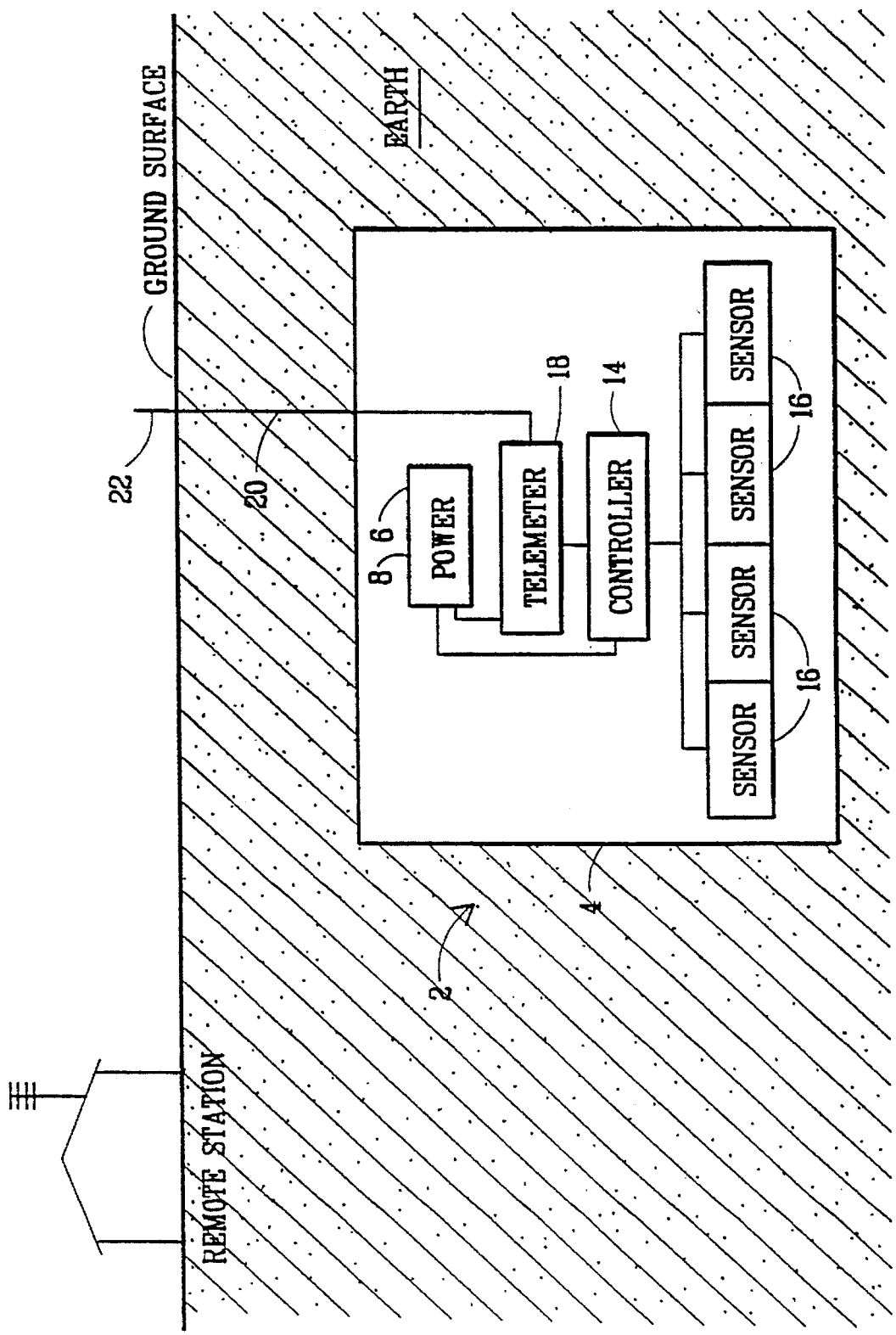
FIG. 1 is a diagrammatic illustration of one form of ground condition monitor illustrative of an embodiment of the invention.
Figure 2:
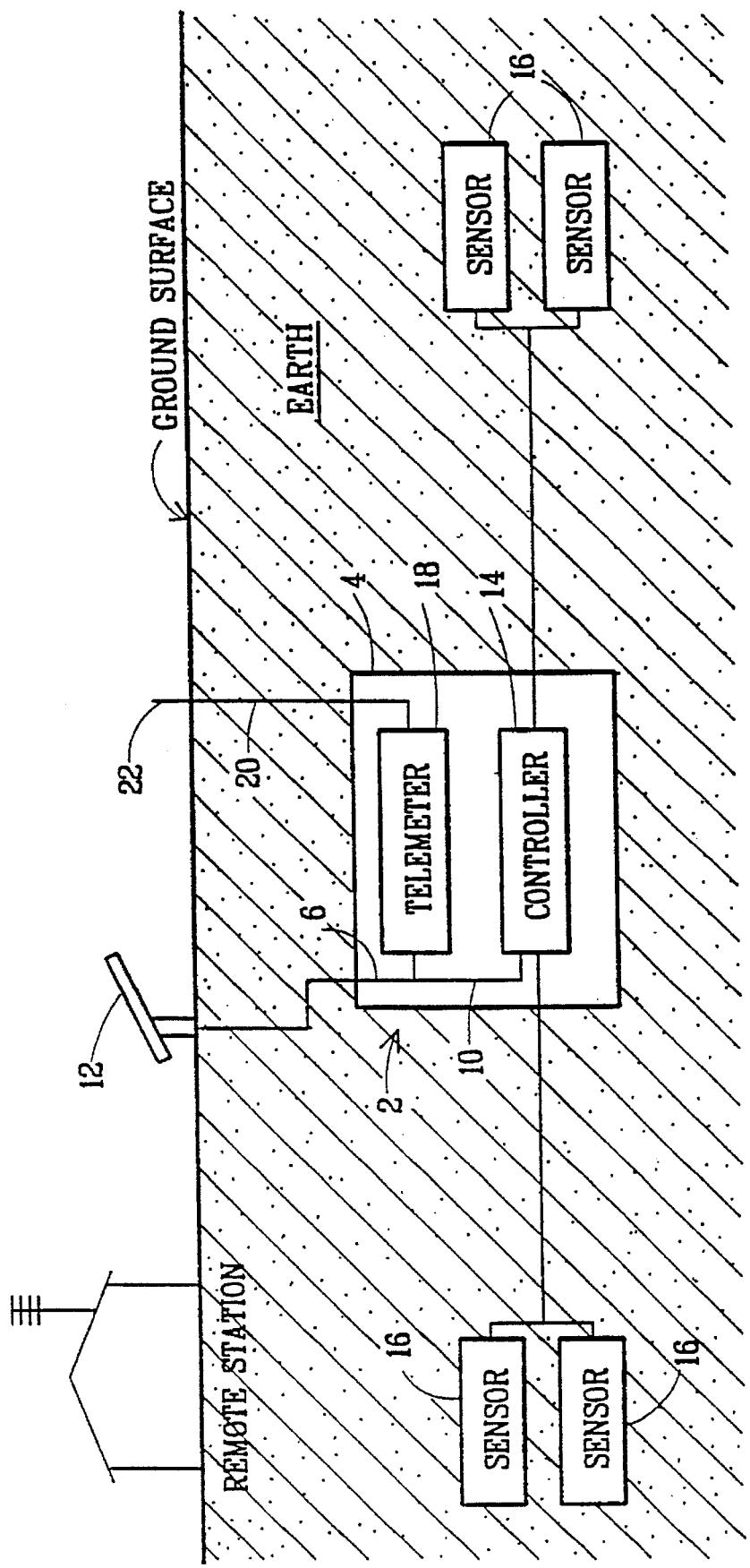
FIG. 2 is similar to FIG. 1, but illustrative of another form of monitor illustrative of an alternative embodiment of the invention.

Referring to FIG. 1, it will be seen that the illustrative monitor 2 includes a housing 4 for disposal underground. A power source 6 is disposed in the housing 4. The power source 6 may, as illustrated in FIG. 1, be a wholly contained unit 8, or may, as illustrated in FIG. 2, comprise a power line 10 disposed in part in the housing 4 and in part extended outside the housing 4 to an outside power source 12, such as an array of solar cells. It will be apparent that the wholly contained power unit 8 may be provided in combination with the outside power source 12, to provide primary and secondary power sources for the monitor.

The monitor 2 further includes a controller 14 disposed in the housing 4 and in communication with the power source 6 from which the controller 14 receives power. The controller 14 is further in communication with a plurality of sensors 16.

The sensors 16 may be disposed in the housing 4, as shown in FIG. 1, or disposed outside of, and spaced from, the housing 4, as shown in FIG. 2. Each of the sensors 16 is adapted to receive signals from the controller 14 and, in response thereto, to send electromagnetic excitation signals into the surrounding earth. The sensors 16 are further adapted to receive reflective electromagnetic signals from the surrounding earth and feed the reflective signals to the controller 14. The controller 14 is adapted to convert the reflective signals to data indicative of properties of the material of the fringing field, or surrounding earth, such as moisture content, temperature, mechanical stresses, and changes in density of the material due to peculation or fatigue, and the like.

A telemeter 18 is disposed in the housing 4 and is in communication with the power source 6 from which the telemeter 18 receives power. The telemeter 18 receives the aforementioned data, which is transmitted to the telemeter 18 from the controller 14, and transmits the data to a remote station.

An antenna 20 extends from the housing 4 for disposition in part 22 above ground surface. The antenna 20 is adapted to transmit the data from the telemeter 18 to the remote station, to receive signals from the remote station, and to transmit the signals received from the remote station to the controller 14.

In operation, the monitor 2 may be operated in a wholly or partly passive mode, wherein no excitation signals are dispatched from the monitor and the sensors 16 merely "listen" for electromagnetic signals from the surrounding earth. Upon receipt of such signals by the sensors 16, the signals are forwarded to the controller 14 which translates the signals into data which is forwarded to the telemeter 18 and thence broadcast to the remote station via the antenna 20.

The controller 14 is programmable to activate transmission by the sensors 16 into the surrounding earth at preselected intervals. For example, the controller may be programmed to activate the sensors every thirty days for a period of 30 minutes, so that comparative studies may be made. Alternatively, or in addition to such programmed probes, the remote station can signal the telemeter 18 to start a probe operation, the telemeter forwarding the command to the controller 14 which activates the sensors 16.

After activation of sensor transmission, reflective electromagnetic waves are received by the sensors 16 and corresponding signals are passed on to the controller 14, which derives data from the signals and passes the data to the telemeter 18 for broadcast to the remote station.

The character of the signals emitted by the sensors 16 into the fringing field may be altered by instructions from the remote station. For example, an operator at the remote station may signal desired changes in frequency, amplitude, and phase of the excitation signals.

The telemeter 18 and antenna 20 contemplated herein have a range of about five miles. However, by the use of surface relay stations signals may be transmitted to a more distant remote station which can isolate the monitor from which data is received. Thus, the monitors may be disposed along levees extending many miles and maintain an electronic "watch" on conditions along the length of the monitored area.

The monitors described herein find utility in areas other than monitoring the structural integrity of earthen works. For example, the monitors may be used to determine the movement of contaminants through a ground area, to determine contamination in landfills and in dredge materials, and to determine ground water contamination levels still further, the monitors may be used for monitoring from remote locations movement of heavy equipment, such as military tanks, personnel carriers, and the like, over the ground.

It is to be understood that the present invention is by no means limited to the particular construction herein disclosed and/or shown in the drawings, but also comprises any modifications or equivalents with the scope of the claims.

Having thus described our invention, what we claim as new and desire to secure by Letters Patent of the United States is:

1. A ground condition monitor comprising:

a housing for disposal underground;

a power source disposed in said housing;

a controller disposed in said housing and in communication with said power source and with a plurality of sensors, said sensors being adapted to receive signals from said controller and in response thereto to send electromagnetic excitation signals into surrounding earth, receive reflective electromagnetic signals from the surrounding earth, and feed the reflective signals to said controller, said controller being adapted to convert said reflective signals to data indicative of electromagnetic properties of the surrounding earth, and to transmit the data;

a talemeter in communication with said power source and disposed in said housing for receiving the data from said controller and transmitting the data to a remote station; and an antenna extending from said housing for disposition in part above the surface of the earth, and adapted to transmit the data from said telemeter to the remote station, to receive signals from the remote station, and to transmit the signals received from the remote station to said controller.

2. The monitor in accordance with claim 1 wherein said monitor includes said sensors which are disposed in said housing.

3. The monitor in accordance with claim 1 wherein said sensors are disposed outside of, and spaced from, said housing.

4. The monitor in accordance with claim 1 wherein said power source comprises a power line in part disposed within said housing and in part extending from said housing and in communication with an outside power source.

5. The monitor in accordance with claim 1 wherein said telemeter is adapted to receive said signals from said remote station and, in response thereto, vary the frequency, amplitude, and phase of the excitation signals sent by said sensors into the surrounding earth.

6. The monitor in accordance with claim 1 wherein said power source comprises a self-contained power source wholly within said housing.

7. The monitor in accordance with claim 6 wherein said power source further comprises a power line in part disposed within said housing and in part extending from said housing and in communication with an outside second power source.

\* \* \* \* \*